United States Patent [19]

Harding et al.

[11] 4,383,871

[45] May 17, 1983

[54] KNIVES FOR FOOD SLICING MACHINES

[75] Inventors: Barry Harding, Worksop; George W. Miles; Barry J. Cowan, both of Sheffield, all of England

[73] Assignee: W.A. Tyzack & Company Limited, Yorkshire, England

[21] Appl. No.: 200,054

[22] Filed: Oct. 23, 1980

[30] Foreign Application Priority Data

Oct. 26, 1979 [GB] United Kingdom ................ 7937258

[51] Int. Cl.³ .......................... C21D 8/02; C21D 9/24
[52] U.S. Cl. ................................... 148/12.4; 148/131
[58] Field of Search ............................ 148/12.4, 131

[56] References Cited

U.S. PATENT DOCUMENTS

| | | | |
|---|---|---|---|
| 506,671 | 10/1893 | Corbin | 148/12.4 |
| 1,346,946 | 7/1920 | Fay | 148/12.4 |
| 3,806,379 | 4/1974 | Darr, Sr. | 148/131 |

FOREIGN PATENT DOCUMENTS 48-27170  8/1973  Japan .................................. 148/131

Primary Examiner—W. Stallard
Attorney, Agent, or Firm—Cushman, Darby & Cushman

[57] ABSTRACT

There is described a method of producing steel machine knives, e.g. of stainless steel, which are through hardened and can be polished to give a consistent visually acceptable surface. Blanks are initially machined, gradually heated to a temperature of the order of 1000° C., and press-form quenched.

7 Claims, 11 Drawing Figures

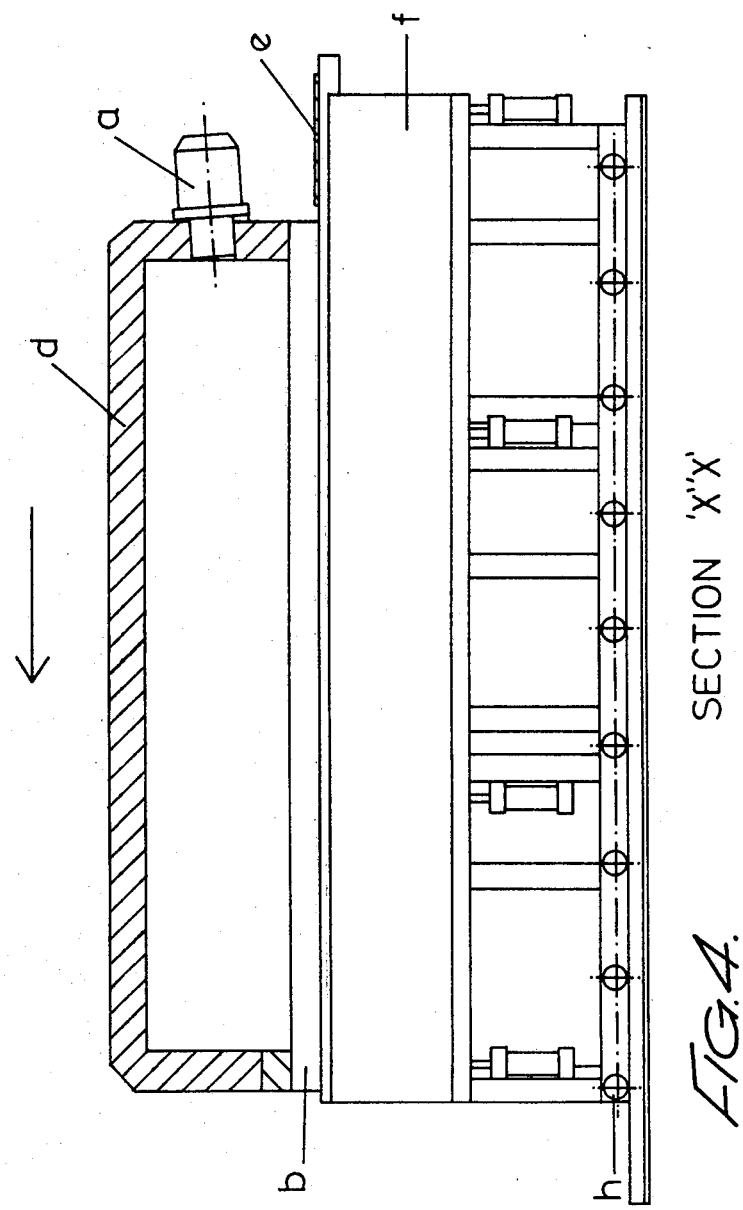

KNIVES FOR FOOD SLICING MACHINES

This invention relates to knives for food slicing machines, and especially to a method of manufacturing them.

For many years circular food slicing machine knives have been designed with such a thickness as to allow most of the shape to be formed by turning on a lathe. The reason for this predominates from a general requirement that the knife should run true, i.e. without wobble, within 0.002" (0.05 mm).

The conventional method of manufacture has involved the use of steel with carbon and chrome, with or without other elements. From this steel slabs are rolled into sheet or plate.

Because of the usual flaws and pits which occur on the surface of the sheet steel an additional machining or grinding allowance is necessary. This ensures that a fine ground or machined surface can be prepared for chromium plating of the knife blank. In practice, therefore, it is necessary to use steel sheet approximating to 50% thicker than the 6 mm or 8 mm knife thickness usually specified by the knife designer, making it a necessity to start with steel sheet around 9 mm or 12 mm, respectively, in thickness.

This need for thicker sheets often makes high price steels, such as the range of so-called stainless steels, prohibitive in cost, and therefore a narrow range of steels in the carbon chrome range with or without other elements, is generally used, making it necessary for the knife blanks to be chromium plated.

In some instances plating is done to a depth purely to resist staining, although hard chromium plating (heavier deposit of chromium plate) can enhance the knife performance in holding an edge.

To achieve the specified requirement of the knife designer the steel sheet, about 50% thicker than the final knife, is cut or blanked into circles. The circles are then bent into concave shape, to give an overall height of about 30% more than the specified height of the knife. This can be done cold because the carbon chrome steel is in a spheroidised/annealed condition. This condition is both advantageous for machining and particularly advantageous in heat treating. This "bent" shape is diagrammatically illustrated in FIG. 1 of the accompanying drawings, and from this form the blanks are then machined to shape, shown in section in FIG. 2 of the accompanying drawings.

The machined blanks are then edge-hardened to a depth no more than half-way along the bevel, and tempered to a final hardness of 58 Rc and greater.

Edge distortion usually occurs as a result of expansion and contraction thus increasing the run out of true or wobble.

The edge-hardened knife blank is then ground on most surfaces to give it its final (FIG. 2) shape and remove all surface flaws and pits. The grinding also corrects the "out of true" or wobble to within 0.002" (0.05 mm) and provides regular fine surface conditions to allow polishing prior to chromium plating and final buffing.

The circular knife is then subjected to the grinding of its secondary bevel which gives it its sharp edge.

An improved method of manufacture has recently come into use using steels in the carbon chromium (with or without other elements) range made into hot rolled strip, because hot rolled strip has a level of surface finish void of pits.

A similar production route to that described above is followed, except that warm forming is used to shape the original blank. This reduces the amount of machining to shape. It should be realised however that there is up to 0.020" (0.5 mm) decarburisation on each side of this strip which must be removed from the hardened zone.

Removal of this decarburised layer is also advisable before chromium plating. This is necessary to give a regular appearance to the plated surface. To fulfil this requirement therefore a 6 mm knife would still need to start from steel strip about 30% thicker than the final requirement.

If "stainless" or stain-resisting steel, that is a steel that does not need to be chromium plated, is used to manufacture food slicing knives by either of the foregoing methods, they become high-priced because of the waste in machining i.e. turning away the high priced material from the initial blank. Additionally, they have an inconsistent surface finish after polishing. This is because the body of the knife is much less hard (15 Rc) than the cutting edge (52 Rc) and polish-grinding such a surface creates a variable appearance.

It is an object of the present invention to provide a method of manufacturing steel machine knives, especially from the so-called stainless or stain-resisting steel, that can be polished to give a consistent visually acceptable appearance over the whole of the knife body. It is a further object of the invention to provide a method of knive manufacture that can utilise a much thinner section of steel eventuating to a usable acceptable shape retaining the profile necessary to equate to existing knife designs. It is a still further object of the invention to provide a method of manufacturing knives which have a concave profile which minimises the amount of machining necessary.

According to the invention a method of making a knife comprises providing a flat blank from steel strip or coil and performing at least an initial machining operation thereon, heating said blank to a temperature conducive to press-forming, and press-forming and hardening the heated blank.

In one embodiment of the invention the pre-machined blank is heated in a furnace and then press-form quenched into substantially its final shape. The furnace may be of the "walking-beam" type, in which the blank will be gradually and uniformly heated throughout its thickness to the optimum temperature for forming and hardening.

In another embodiment the pre-machined blank is given an initial heating and bent under a press tool to form a concavity. It is then further machined and/or drilled before being further heated and press-form quenched to harden it and give it its near final shape.

In a preferred embodiment a blank is pre-machined, warmed in a furnace to a temperature in the range 700°-750° C. and then at least partially formed in a press tool, whereafter it is transferred to a walking-beam furnace and uniformly heated throughout its thickness. From the walking-beam furnace it is placed in a press-form quenching tool wherein it is brought to substantially final shape if this has not been accomplished earlier. The quenching action whilst in this tool hardens the blank. Any required finishing operations, e.g. grinding and polishing, may follow.

The preferred steel composition for use according to the invention contains, by weight, carbon 0.30% to 1.05%; chromium 11% to 18%; with such other elements as silicon, manganese, nickel, molybdenum etc. that can be incorporated into rust- or stain-resisting steel specifications.

A particularly useful steel specification for making knives for food slicing machines in accordance with this invention is, by weight: carbon 0.45%; chromium 13.0 to 15.0%; silicon 1.00% max; manganese 1.00% max; nickel 1.00% max; sulphur 0.045% max; phosphorus 0.045% max.

The steel is suitably supplied in the form of hot rolled strip or coil and annealed to a hardness of 16 Rc. An acid pickling can be incorporated if desired.

By way of example the manufacture of a circular knife for a food slicing machine will now be described with reference to FIGS. 3 to 8 of the accompanying diagrammatic drawings, in which:

FIG. 3(a) is a section through a flat steel blank, the edge of which has been pre-machined;

FIG. 3(b) and 3(c) are sections through, respectively, the upper and lower tools of a press;

FIG. 4 is a section on the line "XX" of FIG. 5;

The following description is appropriate to knives that are required with both a stepped recess and a radiussed recess. The radiussed recess is most appropriate to 4 mm thick knives or less.

In order to make circular knives of, for example, 12.5" diameter (317.5 mm) circular blanks of about 13" (330 mm) diameter are punched from the steel strip or coil, preferably by a compounded tool. An undersized centre hole (with keyway) is punched at the same time. Each circular blank is then pre-form machined FIG. 3(a) on a copy lathe by turning the recess and edge.

Figure 1:
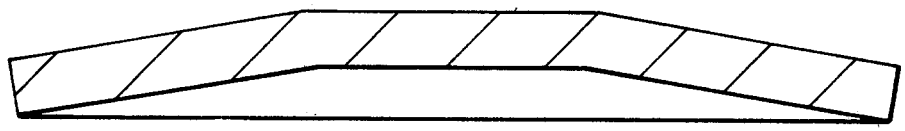
Figure 2:
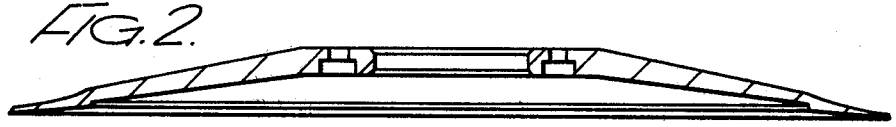
Figure 3B:
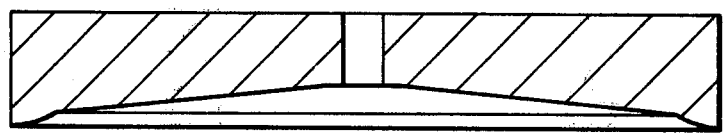
Figure 3A:
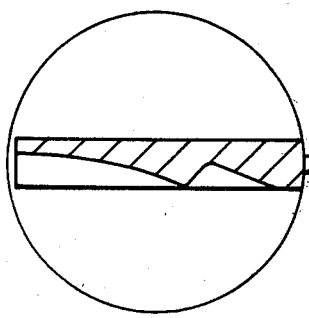
Figure 3C:
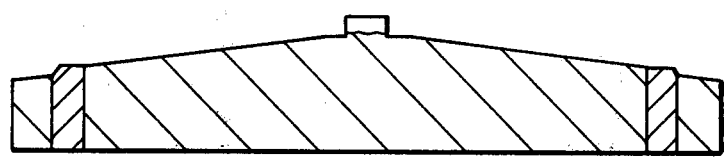

The pre-formed circular blanks are then warm-formed by heating them in a furnace to a temperature of 700°-750° C. and then bending to shape in press tooling as outlined in FIG. 3(b) and 3(c). At this stage marking can be incorporated. Stress relieving is beneficial after this operation.

Having achieved a pre-hardened shape, whatever other holes are necessary can be drilled. Food slicing knives usually have a pair of tapped holes designed for the carrier and guard.

Figure 5:
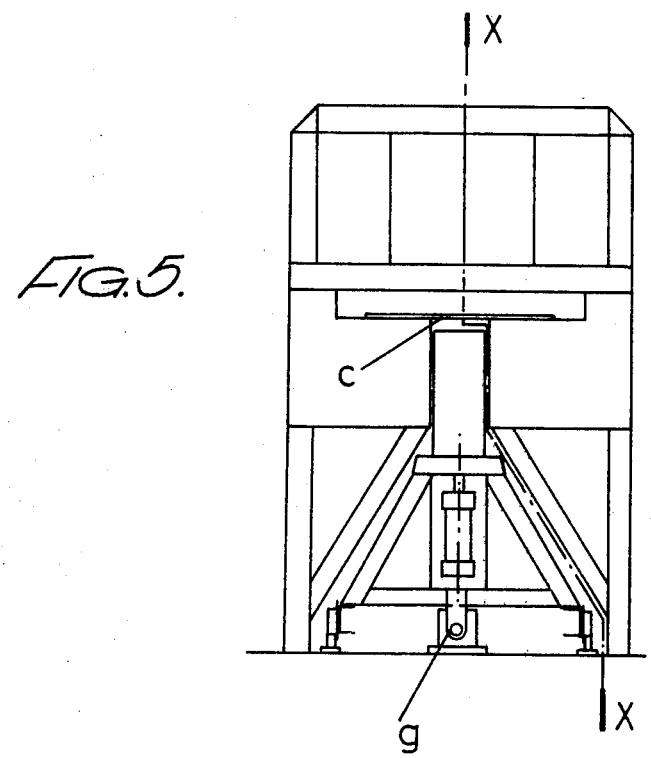
FIG. 5 is an end elevation of a walking-beam furnace.

The pre-formed blanks are then loaded into a furnace, for example the "walking-beam" furnace shown schematically in FIGS. 4 and 5. The furnace of FIGS. 4 and 5 is designed to accomplish uniform heating of the blanks and to regulate a consistent delivery to the press form quenching units (see below). Referring to FIG. 4, the arrow indicates the progression of the blanks through the furnace.

A burner (a) e.g. a gas or oil burner is mounted at the loading end and is designed to produce the maximum temperature of the work at the discharge end (b). The temperature of the blank at discharge is governed by (i) rate of throughput and (ii) heat generated by the burner. In no case should the blank be subjected to excessive temperature that will give grain coarsening.

As stated hereinbefore the advantage of the specially designed "walking-beam" furnace is to heat the knife blanks by accomplishing a gradual rise in temperature, and thus minimising an overshoot.

The slot (c) in the hearth (FIG. 5) allows through heating of the blank, the result being consistently heated blank at the discharge point (b) of the furnace.

The top of the furnace (d) is built on a modular construction and any worn or burnt-out section can be quickly replaced. A ceramic fibre lining for roof and walls is used to reduce heat losses.

The blanks are suitably picked up by vacuum pads and are deposited at the entry (e) to the furnace and then on to the "walking beam" (f). This loading device is interlocked with the furnace circuitry and carefully timed to the furnace temperature and bending press operation or press formed quenching unit.

The beam (f) is actuated by an air cylinder, and the beam assembly (g) travels along tracks mounted at the base of the furnace through rollers (h).

Figure 6:
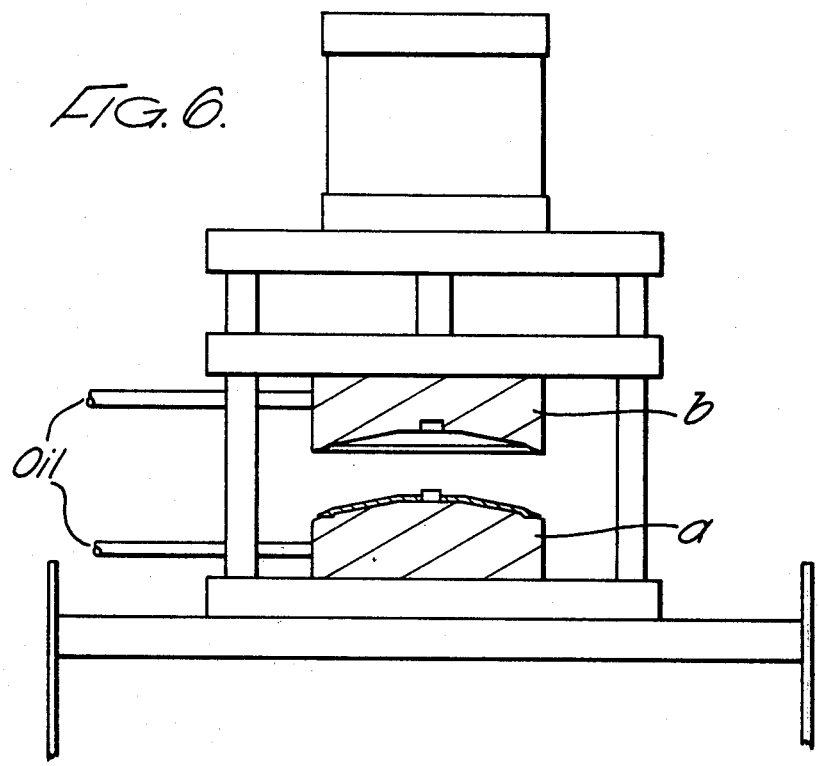
FIG. 6 is an elevation of a press-form tool showing the mating parts separated.
Figure 7:
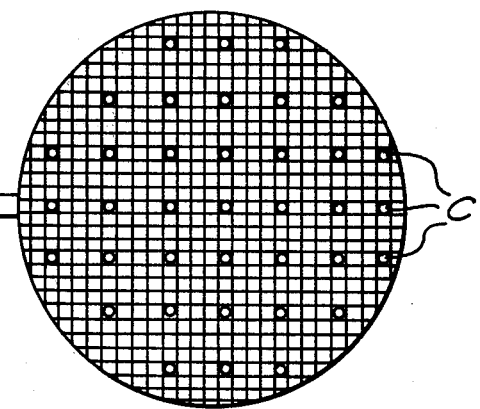
FIG. 7 is a plan view of a blank-contacting face of the tool of FIG. 6.

The heated pre-formed knife blanks are removed from the furnace exit (b) and fed into the tools of the press form quench unit shown in FIGS. 6 and 7 of the accompanying drawings.

These tools are suitably designed to impart the final contour to the blank, except for a minor difference in height which will be referred to later. The tools comprise a stationary tool (a) and a moving mating tool (b). Both are formed with a plurality of holes (c) through which quenching fluid may flow.

The pre-formed knife blank is set into the stationary tool (a) onto a location peg.

In the case of pre-formed knife blanks manufactured from the particularly specified carbon high chrome steel the hardening temperature of these blanks should be of the order of 1000° C. It should be carefully noted that if time is lost between furnace and tool the blank could be subjected to air hardening, and as well as losing its shape, cracking of the blank could also occur.

When the blank is in position on the stationary tool (a), the moving tool (b) is actuated downwardly, thus holding the blank in shape in the tools. At this time the pressure is slackened off slightly and oil is pressure fed to both tools, the oil flowing through the holes (c) completely to submerge the shaped blank.

The purpose of this action of press-formed quenching is to simulate the pre-formed shape and hold to the required contour during the early quenching process, avoiding the change of shape that otherwise prevails in free quenching.

If the knife contour is particularly complex, it may be necessary to incorporate ejectors into the tools, this being due to contraction of the component.

This hardening operation is preferably aimed at giving the knife blank a hardness of the order of 54 Rc.

Light tempering/stress relieving may then be given to the blank, aiming for 52/54 Rc.

The blanks are then ready for the final processes. The centre hole is ground to size as necessary. At a hardness of 52/54 Rc re-turning is possible without special equipment, although whatever re-turning is necessary removal of stock is minimal. Re-turning can be undertaken to compensate for any small deformation that occurs in the hardening process.

It will now be necessary to grind the blank to a suitable finish.

Figure 9:
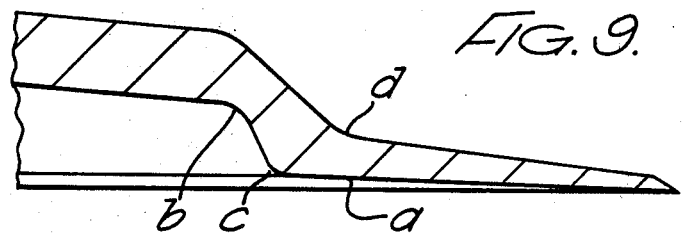
FIG. 9 is a detail of FIG. 8.

The flat face (a) (FIG. 9) is precision ground to the required angle and at the same time the recess face (b) and recess diameter (c) are fine finished to size. The hollow bevel (d) is fine ground by a formed grinding wheel or a copy profile grinder.

Figure 8:
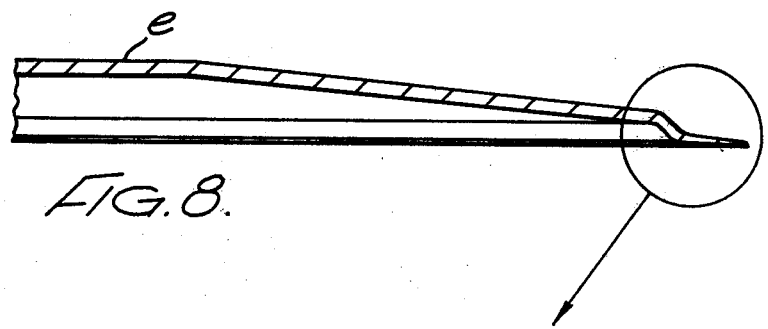
FIG. 8 is a section through part of a finished knife.

The outer boss (e) (FIG. 8) can now be ground to adjust to the final height (as indicated earlier in forming the blank there was an allowance for this adjustment in height to be made).

The knife blanks can then be processed by normal finishing processing on multi-head belt grinding and polishing equipment.

The final process is to grind the secondary bevel sharp and fulfil the minimum run-out of true or wobble requirement.

By the method of the invention there can thus be provided a machine knife of circular or other shape, which can be pre-shaped whatever size and section and through-hardened in stainless steel or other prescribed steels. Because of this a substantial reduction in turning and wastage of material is possible. Furthermore, utilisation of thin sections of steel is possible, down to 0.1" (2.5 mm), thereby establishing a competitive method of producing machine knives.

We claim:

1. A method of making a machine knife comprising providing a flat blank from steel strip or coil and performing at least an initial machining operation thereon, heating said blank to a temperature conductive to press-forming, press-forming and through-hardening the heated blank, and imparting to the blank a stain-resisting uniform polished surface.

2. A method as claimed in claim 1 wherein the pre-machined blank is heated in a furnace and then press-form quenched into substantially its final shape.

3. A method according to claim 1 wherein the pre-machined blank is initially heated and bent under a press tool to form a concavity, is further machined and/or drilled, is heated and press-form quenched to harden it.

4. A method according to claim 1 wherein the blank is pre-machined, warmed in a furnace to a temperature in the range 700°–750° C., at least partially formed in a press tool, uniformly heated throughout its thickness, and press-form quenched.

5. A method as claimed in any of claims 2 to 4 or 1 wherein the steel contains, by weight, 0.3% to 1.05% carbon and 11% to 18% chromium.

6. A method as claimed in claim 1 wherein the blank is hardened to a hardness in the range 52 to 54 Rc.

7. Knives made by the method of claim 1.

* * * * *